Jan. 15, 1963

H. W. CHRISTENSON 3,073,179

TORQUE TRANSMITTING MECHANISM

Filed Dec. 4, 1953

INVENTOR.
HOWARD W. CHRISTENSON
BY
Barnes, Kisselle, Laughlin & Raisch
ATTORNEYS.

Jan. 15, 1963 H. W. CHRISTENSON 3,073,179
TORQUE TRANSMITTING MECHANISM
Filed Dec. 4, 1953 5 Sheets-Sheet 3

INVENTOR.
HOWARD W. CHRISTENSON
BY
Barnes, Kisselle, Laughlin & Rausch
ATTORNEYS.

Jan. 15, 1963   H. W. CHRISTENSON   3,073,179
TORQUE TRANSMITTING MECHANISM
Filed Dec. 4, 1953   5 Sheets-Sheet 5

INVENTOR.
HOWARD W. CHISTENSON
BY
ATTORNEYS.

United States Patent Office 3,073,179
Patented Jan. 15, 1963.

3,073,179
TORQUE TRANSMITTING MECHANISM
Howard W. Christenson, Indianapolis, Ind., assignor to General Motors Corporation, Detroit, Mich., a corporation of Delaware
Filed Dec. 4, 1953, Ser. No. 396,272
34 Claims. (Cl. 74—645)

This invention relates to a mechanism for the transmission of torque at different speed and torque ratios and it has to do particularly with such a mechanism commonly called a transmission, useful with internal combustion engines.

The transmission of this invention is particularly adapted for use in automotive vehicles and it is believed to be expeditious to disclose and describe the transmission, and to consider its performance, with respect to an automotive vehicle, although it is to be appreciated that the transmission is not, in any sense, limited to vehicle usage.

In general, the objects of the invention are to produce a rugged transmission capable of long usage without adjustment; a transmission wherein hydraulic controls are employed and wherein the hydraulic loads are axial; a transmission which will present an overall economy of operation; a transmission wherein the shock of shifting from one ratio to another is cushioned and minimized; a transmission wherein the hydraulic control system therefor is largely free of timing devices or valves and which, accordingly, is capable of trouble-free operation over an extended period.

To these ends, the present invention provides a transmission which has some automatically acting mechanism operable for changing ratios in the transmission and for establishing other conditions in the transmission, and it has also some mechanism under the manual control of the operator or driver of a vehicle. The manual control can be manipulated to effect a change in the torque ratio, and the transmission, in response to such manual control, is such as to make the shift or change under torque load.

The transmission involves a combination of co-related elements including a fluid torque converter with a lock up clutch therefor, an intermediate gear unit for producing different ratios and a multiple speed gear unit with planetary gearing. The intermediate gear unit has an automatic action, while the multiple speed gear unit is under manual control in the sense that the several ranges thereof may be selected and caused to become effective to transmit torque at a ratio selected by an operator. The lock up clutch for the torque converter not only serves to transmit torque independently of the torque converter in normal operation, but the control therefor automatically functions to release the lock up clutch when a shift is being made, so that the fluid torque converter cushions the shift from one speed to another. Other objects will become apparent as the detailed description is considered in connection with the accompanying drawings:

A housing 1 is arranged to be attached to an engine and a member 2 is to be attached to the engine crank shaft and it constitutes the fly wheel or part of the fly wheel mass. Secured to the member 2 is a shell 3 with blades or vanes 4 and it constitutes the pump or impeller of a torque converter. The rotor or driven member of the converter is shown at 5 having blades 6, and the member 5 is secured to a hub member 7 splined or otherwise secured as at 8 to a shaft 9. The torque converter shown has two stators with blades 12 and 13 each associated, by means of an overrunning or one-way brake 16 and 17, with a hub element 18 fixed to a stator or fixed ground sleeve 19 fastened to the rear wall or partition 20 of the housing 1. This torque converter, as shown is one of a known-type, and the impeller, rotor and stators define a torus chamber in which the blades are located. As well known by those skilled in the art, rotation of the impeller transmits torque to the rotor incident to the hydraulic medium impinging upon the blades. The blades of the stators so change the direction of the flow of the oil in the torus chamber, that within the range of the torque converter, the ratio infinitely varies until such time as the rotor comes up to the speed of the impeller less, of course, the usual amount of slippage in the device.

The fly wheel member 2 is shaped to provide a cylinder 22 which is of annular form and in the cylinder is an annular piston or head 23 slidably keyed to the member 2 as at 26 with a return spring at 25. A clutch back-up plate 27 is secured to the member 2, and lying between the piston 23 and the plate 27 is the driven disc 29 of a clutch, its inner peripheral edge being mounted as at 30 on the hub member 7. It will be appreciated that when hydraulic medium under pressure is introduced into the cylinder 22, the piston 23, which is likewise a clutch plate, is shifted and the driven member 29 is frictionally engaged between the clutch plate 23 and back up plates 27 so that torque is transmitted directly to the member 7 and the torque converter, so to speak, is cut out of the system and transmits no torque. Suitable oil seals 31 and 32 are provided.

Mounted on the partition is a pump 35 with pump elements 36 therein driven by tangs 37 on a member 38 attached to the impeller 3. Thus the pump 35 is driven by the engine through the torque converter housing.

The shaft 9 extends through the partition 20 and next adjoining the torque converter is a two speed gear set which may be conveniently termed a splitter gear unit or overdrive unit. This gear construction includes a planetary gear set with a carrier 40 for a plurality of pinion gears 41, each journalled on a pin 42, the carrier 40 being splined or otherwise secured to the shaft 9 as at 44. There is a sun gear 45 with external teeth meshing with the teeth of the pinions and a ring gear 47 with internal teeth meshing with the teeth of the pinions. The sun gear is formed with a portion, integral therewith or otherwise, of larger diameter as shown at 48, and between the internal surface of the portion 48 and shaft 9 is an overrunning or one-way clutch generally illustrated at 49. Overrunning clutches of this type are well known. The member 48 is connected to one member 50 of a friction control device. This member 50 is in the form of a single plate and it lies between a fixed reaction plate 51 and a shiftable plate or ring 52. The member 52 is slidably keyed to the member 51 as at 53.

Figure 1:
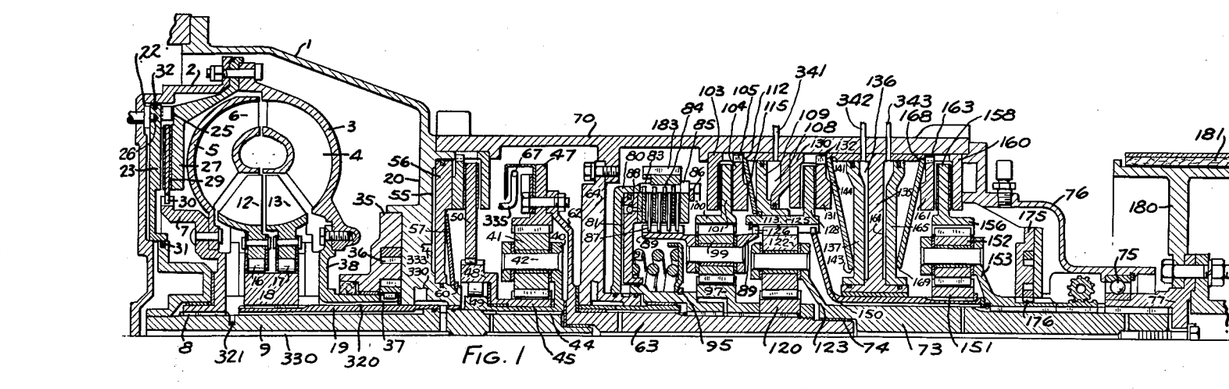
FIG. 1 is a cross sectional view showing a transmission constructed in accordance with the invention and indicating the fluid torque converter, the intermediate gear unit and the range change gear unit.
Figure 2:
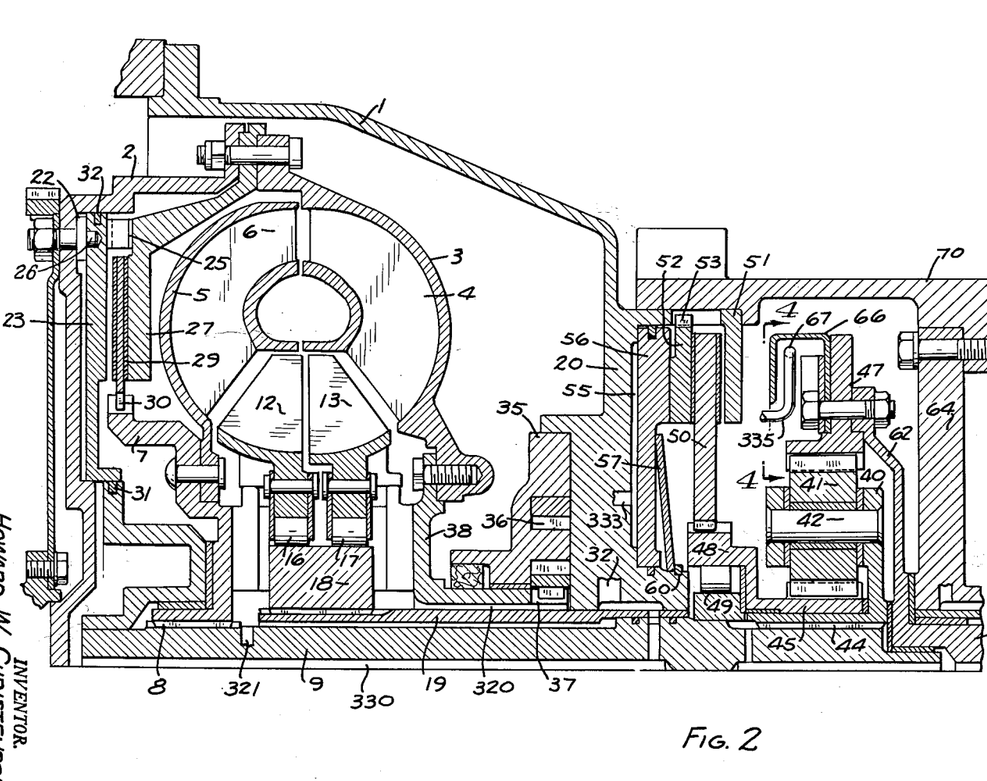
FIG. 2 is an enlarged cross sectional view illustrating the torque converter and the intermediate gear unit.
Figure 3:
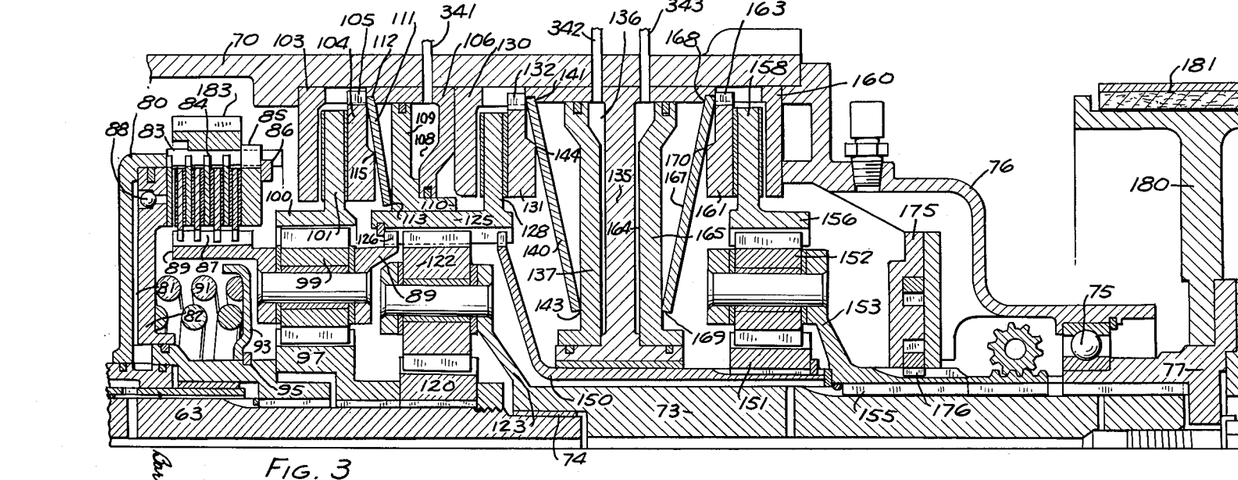
FIG. 3 is an enlarged cross sectional view illustrating the speed range unit.
Figure 4:
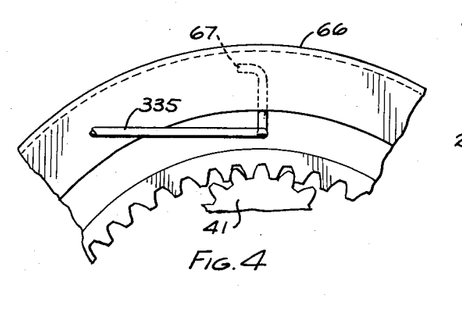
FIG. 4 is a detail view illustrating a Pitot tube for effecting governing pressure of a hydraulic medium.

The partition 20 is formed with a cylinder 55 in which is a piston 56 of annular form shiftable for engaging and shifting the member 52. The piston 56 situated in the cylinder with suitable seals, as shown, directly engages the member 52. Spring means in the form of a Belleville washer 57 has its inner peripheral edge mounted upon an extension of the partition 20 and held by a snap ring 60 while its outer peripheral edge engages the piston 56 to hold it normally shifted to the left as FIG. 1 is viewed. It will be appreciated that if the piston 56 is shifted to the right against the action of the spring 57, that the member 50 is frictionally engaged between members 52 and 51. This construction constitutes a friction clutch. However, when it is fully engaged, the plate 50 is held stationary, by the gripping members 51 and 52 and in situations of this kind it has become somewhat of an accepted practice to call such a structure a brake instead of a clutch. Such structure is also termed a "ground clutch." To the contrary, the term clutch is usually applied to a construction where two rotary members are clutched together. Therefore, this structure is herein termed a "brake" merely to conform to the practice, but it is to be understood that this is done without any intention of implying that there is a difference between a clutch and a brake except as above stated. This grounded clutch or brake arrangement allows the rotating member 48 to seek its own running center preserving good polar alignment of the gear train.

The ring gear 47 is connected to a torque transmitting member 62 mounted on or constituting an integral part of a shaft 63 journalled in a dividing partition or support member 64. Mounted on the ring gear member is an annular channel 66 in which is disposed a stationary Pitot tube 67 connected to a line or conduit for hydraulic control means, soon to be described. The channel is a collector adapted to have a quantity of oil therein which forms a rotating ring of oil as the ring gear rotates in operation, and the open end of the Pitot tube faces toward the on-coming oil and thus is subjected to the pressure as will presently be seen.

The mechanical operation of this overdrive gear unit is as follows:

Basically, the unit is for the purpose of transmitting torque from the shaft 9 to the shaft 63. If the brake member 50 is released and shaft 9 is rotated, the shaft 63, which is the torque output member, offers resistance. The result is that the carrier 40 will turn in a forward direction and the resistance offered by the ring gear 47 tends to turn the pinions on their axes, which in turn tend to rotate the sun gear in a direction which is the same as that of the carrier. The overrunning clutch 49 engages and prevents the sun gear from rotating faster than the carrier and shaft 9. Therefore, the shaft 9, the sun gear 45, the pinions 41 and the ring gear 47 become locked up as a unit and torque may be transmitted from the shaft 9 to the shaft 63 at a 1:1 ratio.

On the other hand, let it be assumed that hydraulic medium is introduced into the cylinder 55 and the control brake becomes engaged thus bringing the sun gear to zero r.p.m. which, of course, is possible as the overrunning clutch permits of this action. Rotation of the carrier 40 causes the pinions 41 to rotate on their axes as they revolve about the sun gear with the result that the ring gear 47 is rotated at a speed faster than that of the shaft 9. Thus, it is that this splitter gear is capable of transmitting torque in a locked up condition where the ratio between the shaft 9 and the shaft 63 is 1:1, and in an overdriving relationship wherein the shaft 63 is rotated faster than the rotation of the shaft 9. When the overdrive unit is operating at 1:1 ratio, at which time the shaft 9 and the sun gear 45 are coupled together by the one way clutch 49, a free wheeling condition exists in the sense the vehicle may overrun the engine. However, an automatic shift control keeps the unit in overdrive unless the engine throttle is held open, so in service no free wheeling occurs in normal operation.

Rearwardly of the overdrive or splitter gear unit is a housing 70 which contains the range change gearing and it will be seen that the shaft 63 projects into this housing. The shaft 63 is the input member of this unit while shaft 73 is the output member. Shaft 73 is piloted on the shaft 63 as at 74 and it is mounted in a bearing 75 carried in a housing end piece 76. The inner race of the bearing may actually seat upon a hub 77 mounted on the end of the shaft 73.

Interposed between the members 63 and 73 are planetary gear sets and brakes and a clutch for effecting various driving ratios. There is a member 80 with a hub portion splined to the shaft 63 which is formed to provide a cylinder 81 in which is located a piston 82. The member 80 has a peripheral flange 83 upon which is mounted a plurality of driving clutch plates 84. A back-up plate 85 is held by a ring 86 and interleaved with the clutch plates 84 are driven clutch plates 87, mounted on a carrier member 89 of a planetary gear set. One or more coil springs 91 hold the clutch plates separated, the spring or springs acting upon the piston 82 and reacting on a member 93 positioned on the hub of the member 80 by a ring 95. It will be understood that if hydraulic medium is delivered into the cylinder 81 under pressure, the springs 91 are compressed and the clutch is engaged. The piston 82 is advantageously provided with a port formed with a seat for a ball 88 which structure provides a check valve. This check valve holds oil under pressure when delivered into the cylinder 81 but permits readily of the escape of oil or hydraulic medium from cylinder 81 when it is not pressurized. Thus, for example, when the cylinder 81 is not pressurized, any oil trapped in the cylinder 81 may escape through the check valve. Centrifugal force tends to unseat the ball since it rests on a cone seat, however line control pressure is adequate to keep the ball seated when it is intended that the clutch be applied.

The sun gear 97 of the planetary gear set is splined to the shaft 63 and its teeth mesh with those of pinions 99, each mounted on a pin supported by the carrier 89. The pins are supported at opposite ends and while the carrier is comprised of two elements, the carrier elements function as one structural piece and, therefore, reference character 89 is applied to both sides of the carrier. There is a ring gear 100, the teeth of which mesh with those of pinions 99 and this ring gear is a controlling element. For this purpose the ring gear has a disc-like outer portion 101 which constitutes a brake member. The portion 101 lies between a fixed reaction member 103 and a pressure plate 104 slidably and non-rotatably connected to the reaction member 103 as at 105. A cup-shaped member 106, mounted fixedly relative to the housing 70, forms a cylinder 108 in which is located a piston 109 with suitable seals as shown. As shown the piston has a hub portion 110 which extends through the inner peripheral part of the cylinder 106 and a seal is shown at this location.

Introduction of hydraulic medium into the cylinder 108 serves to shift the piston 109 to the left for the purpose of shifting the pressure plate 104 to cause the member 101 to be engaged between the pressure plate and the reaction member 103. For this purpose, there is an actuating and cushioning spring 111 positioned between the piston and the pressure plate and this is in the form of a coned washer or ring of suitable metal such as steel having elastic characteristics and such a spring is generally known as a Belleville spring. The outer peripheral portion is seated as at 112 in a fixed seat such as a portion of the member 106, while its inner peripheral portion is engaged by the piston, as shown at 113. The intermediate part of the Belleville spring engages the pressure plate as at 115. Thus, if the piston shifts to the left the spring acts as a lever of the second order and is preferably arranged, as shown, to increase the mechanical advantage of the piston. The spring thus serves to cushion the engaging action of the brake and also serves as a retracting spring to retract the piston into its cylinder when the pressure of the hydraulic medium is released. However, the primary function of the member 111 is to increase the application of thrust force to the plate 104.

Another sun gear 120 is splined to the shaft 63 and it is associated with a plurality of pinions 122. These pinions are mounted in a carrier constituted by a flange 123 on the output shaft 73. A ring-gear 125 has internal teeth meshing with those of the pinions and this ring gear is non-rotatably connected to the carrier 89, as indicated at 126. The ring gear 125 has an outer peripheral portion of disc form 128 which lies between a reaction member 130 and a pressure plate 131 slidably keyed to the reaction member 130 as at 132. A member 135 forms a cylinder 136 for a piston 137. A Belleville spring 140 has its outer peripheral edge seated as at 141 in the outer portion of member 135 and its inner edge positioned for engagement with the piston as at 143 while the Belleville spring engages the pressure plate 131 as at 144. Upon introduction of hydraulic medium into cylinder 136 the piston shifts to the left and through the Belleville washer shifts the pressure plate 131 to the left to thereby frictionally engage the portion 128 of ring gear 125 between the pressure plate and the reaction member 130. The Belleville spring cushions the engaging action, serves to retract the piston and provides leverage advantage. It will be noted that the spring 140 provides a greater mechanical advantage than the spring 111; this is a preferred arrangement because the control of the member 128 has to do with the low speed gearing and the additional leverage advantage is desirable to take care of the high torques encountered.

Non-rotatably connected to the ring gear 125 is a sleeve 150 which extends through the member 135 and has a sun gear 151 mounted thereon. Associated with this sun gear are a plurality of pinions 152 supported by a carrier 153 splined or keyed to the shaft 73 as at 155. Associated with the pinions 152 is a ring gear 156 with a disc-like outer peripheral portion 158. The portion 158 lies between a reaction member 160 and a pressure plate 161 which is slidably keyed to the reaction member as at 163. The member 135 also forms a cylinder 164 for a piston 165 and between the piston and the pressure plates 161 is a Belleville washer or spring 167. The outer edge of the Belleville spring is seated or fulcrumed as at 168, the inner edge arranged to engage the piston as at 169 and an intermediate part of the spring is arranged to engage the pressure plate 161 as at 170. Shift of the piston 165 to the right incident to introduction of hydraulic medium into the cylinder 164 causes the spring 167 to shift the pressure plate 161 to the right to thus engage the brake member 158 between the pressure plate 161 and the reaction member 160. When hydraulic pressure is relieved from the cylinder 164 the spring 167 serves to retract the piston.

There is a pump generally indicated at 175 having internal operating pump parts, one of which is keyed or splined as at 176 to the hub of the member 153. This pump, as will be observed is operated by the output member 73.

Mounted on the hub 77 as by means of bolts to which a final drive may be connected, is a brake member 180 arranged to be frictionally engaged by a brake band or shoe 181. The provision of this brake structure, however, is optional. A gear 183 with external teeth, may be mounted on the member 83 to thus provide a power take-off.

It is believed to be expedient at this time to give a general description of the operation of the mechanism without reference to the control. It has already been set forth how the overdrive unit which involves the brake member 50 and the associated planetary gear set may transmit torque in direct drive, that is, at a 1:1 ratio and can transmit torque in overdrive manner. The multiple disc clutch involving the plates 84 and 87 is termed the "high clutch" and when it is engaged torque is transmitted from shaft 63 to output member 73 at a 1:1 ratio. The brakes, using the term "brake" because the controlled member is engaged with fixed element, or grounded, so to speak, are labeled as shown as intermediate, low and reverse, meaning an intermediate gear reduction, a low gear reduction and a reverse drive. When the high clutch is engaged, the sun gear 97 and the carrier 89 are locked together as a unit. Since sun gear 120 is mounted on the shaft 63 and since the carrier 89 is keyed or splined to the ring gear 125, the sun gear 120 and the ring gear 125 are locked together as a unit, so all these parts rotate in unison and the pinions 122 cannot turn on their axes and therefore torque is transmitted at a 1:1 ratio from shaft 63 to the output member 73. At this time the intermediate, low and reverse brakes are released.

If the intermediate brake is engaged the ring gear 100 is held stationary. The carrier 89 revolves in the same direction of rotation as the sun gear 97 but at a lower speed because the pinions 99 in turning on their respective axes, revolve within the ring gear 100. This slower movement is imparted to the ring gear 125. Sun gear 120 is acting upon the pinions 122 and the pinions 122 in turning on their axes revolve about the internal gear 125 thus transmitting torque to the carrier 123 and output shaft 73. The speed of rotation of the carrier 123 is thus greater than that of the rotation of the carrier 89 but less than the speed of rotation of the shaft 63 and sun gear 120. At this time, the high clutch and the low and reverse brakes are released.

When the low brake is engaged the ring gear 125 is held stationary and rotation of the sun gear 120 causes the pinions 122 to rotate on their respective axes and revolve about the stationary ring gear 125 thus transmitting torque to the carrier 123 and output shaft 73 at the low speed ratio. At this time the high clutch and the intermediate and reverse brakes are released.

When the reverse brake is engaged the ring gear 156 is held stationary. It is to be remembered that reaction is offered by the carrier 153. At this time with the high clutch and intermediate and low brakes released, the sun gear 120 acts on the pinions 122 and thus the ring gear 125 is driven in the reverse direction. The ring gear 125, as above described, is connected through the sleeve 150 to the sun gear 151 and thus sun gear 151 is driven in the reverse direction. Since ring gear 156 is held stationary the reverse rotation of the sun gear 151 causes the pinions 152 in rotating on their respective axes, to revolve about the stationary gear 156 in the reverse direction. And thus torque is transmitted in reverse to the carrier 153 which is splined to the output shaft 73.

Thus it will be observed that the range change section of the transmission, in addition to reverse, has a high range, an intermediate range and a low range and multiplying this by the two speed ratios obtained in the splitter gear unit there is a total of six ratios. These are mechanical ratios. In addition to this, the fluid torque converter provides for further torque variation. It is to be appreciated that the specific ratios may be varied but in order to clarify the situation, one example is given herewith. This example also shows the manual selection of high, intermediate, low and reverse in the range change section, and the automatic ratio change in the splitter gear section. This example also shows a torque converter with a maximum torque ratio of 3.6 which is also subject to change or variation.

| Manual Selection Range Change Unit | Automatic Selection Splitter Gear Unit | Mechanical Ratio | Maximum at Stall |
|---|---|---|---|
| High | Overdrive | .72:1 | 2.6:1 |
|  | Direct | 1.00:1 | 3.6:1 |
| Int | Overdrive | 1.36:1 |  |
|  | Direct | 1.89:1 | 6.8:1 |
| Low | Overdrive | 2.56:1 |  |
|  | Direct | 3.56:1 | 12.8:1 |
| Rev | Overdrive | 2.80:1 |  |
|  | Direct | 3.89:1 | 14.0:1 |

It will be noted that the controlling element of the planetary gear sets for intermediate, low and reverse, and also in the overdrive gear unit, are all elements to be grounded; that is to say, to be frictionally engaged, brought to and held at zero r.p.m. when they are functioning as controlling elements. In this way the structure is simplified in that rotating seals are eliminated. In other words, for example, a conduit for hydraulic medium leading into the cylinder 108 needs no rotating seal as the conduit connection may be made directly with the stationary cylinder.

The structure is capable of operating over a long period of time without adjustment inasmuch as all wear on the brake and clutch members is adequately taken up by movement of the operating pistons in their cylinders. Preferably, all friction fraces are metal, there being suitable metal for friction purposes applied to the faces of the pressure plates and reaction members. This could be reversed in that the facing metal may be placed upon the ground members of the planetary gear sets. Moreover, all hydraulic loads are purely axial and all mechanical loads are pure torsion giving a maximum capacity with a minimum distortion or alignment problems.

Moreover, it will be observed that the control members of the planetary gear sets for intermediate, low and reverse are all ring gear members and merely float on their several pinions. The brake plates 101, 128 and 158 are advantageously integrally formed with their respective ring gears. These brakes, as well as the one in the splitter gear unit, are of the single plate variety which reduces spin friction and the single plate resists heat checks and distortions better than multiple plate designs.

Figures 5, 5A, 5B:
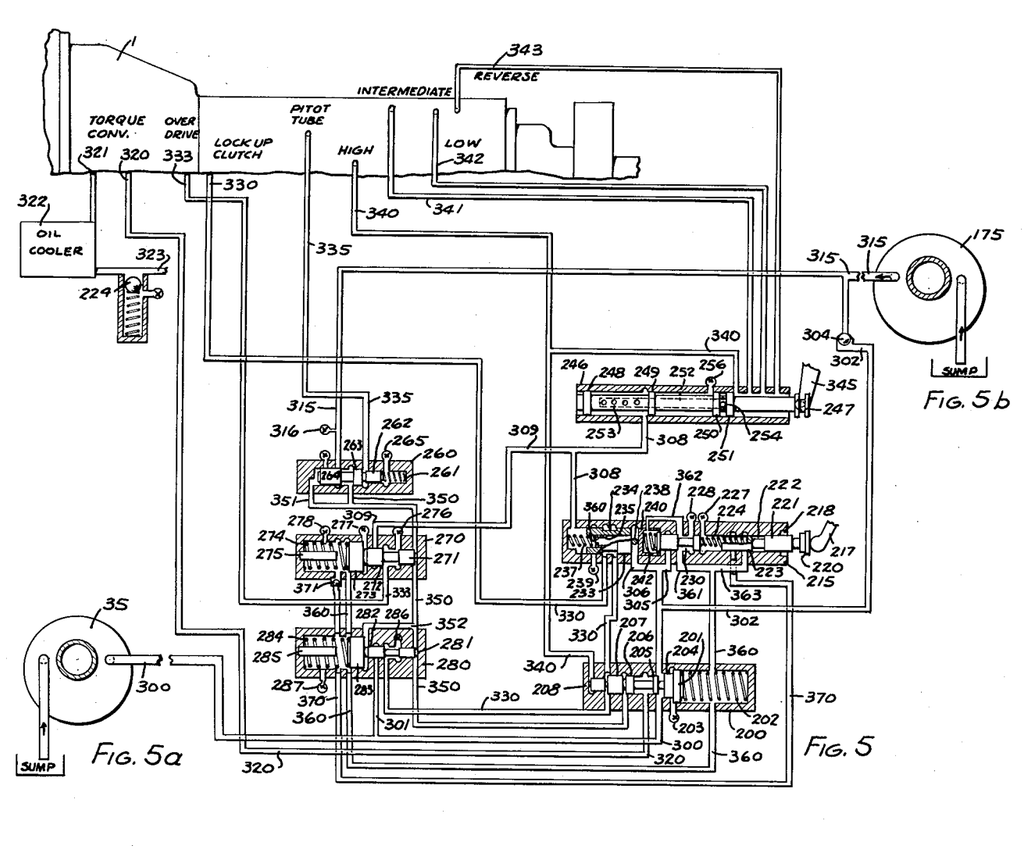
FIG. 5 is a view diagrammatically largely in a single plane, illustrating the hydraulic control system and showing some of the mechanical features of some of the elements in the control system.
FIG. 5a is a diagrammatic view of the engine driven pump and associated with the diagrammatic view of FIG. 5.
FIG. 5b is a diagrammatic view of the rear pump.

In considering the control as illustrated in FIG. 5, it may be well to first discuss the valves and then consider the pressure lines or conduits of the system. The main pressure regulator valve is illustrated at 200 and the body thereof has a bore with a valve member 201 therein acted upon by a spring 202. The body has an exhaust port 203 and the valve member has a smaller part 204. The body has a smaller bore in which is located a head 205 of the valve member, the valve member having a further head 206. There is a separate head or valve member 207 and a further separate head or valve member 208. By seperate is meant that the members 206, 207 and 208 are not joined together; but the head or piston portions 201, 204, 205 and 206 are united or integrally formed.

There is a throttle valve generally indicated at 215 provided with a bore with a member 216 therein which is actuated by a mechanical element 217 which is a part of the throttle mechanism and which moves incident to the movement of the engine throttle by the operator. The body has a recess 218 into which the head 220 may enter at appropriate times, as will later be seen. The member 216 has a head or land 221, a port 222 and a head or land 223. A spring 224 acts upon the member 216 and holds it against the throttle member 217 and it reacts against a throttle valve member having a head 226 which, in FIG. 5, is shown as positioned between an exhaust port 227 and an exhaust port 228. This valve member has an ensmalled part which forms a port 230 and it has a head 231.

Associated with the throttle valve is a lock up clutch cut off valve constituted by a hollow member 233 and which may be situated in the bore of the body 215. This member has a port 234 and it has an interior part 235 provided with an orifice 236. A spring 237 acts on the member 233; the part 235 may be press fitted into the valve member 233 and arranged to take the force of the spring. The spring 237 holds the valve member 233 against a stop, such as a pin 238. The lock up cut off valve has an exhaust port 239. A member 240 with a port 241 and which is of hollow form is positioned between pin 238 and a spring 242 and the spring acts upon the valve member 231.

There is a selector valve arranged to be manipulated by an operator through the means of a suitable lever 245. The body 246 has a bore therein in which is located a valve member 247 with a land 248, a land 249, and lands 250 and 251. The valve member has a central passageway 252 which connects to a plurality of ports 253 between the lands 248 and 249 and also connects to a plurality of ports 254 between the lands 250 and 251. The body has an exhaust port 256.

There is a governor valve 260 in which there is a valve member acted upon by a spring 261 and this valve member has a head 262, a head 263 and a head 264. The body has an exhaust port 265 and an exhaust port 266.

An overdrive shift valve with a body 270 has a valve member with a relatively small head 271 therein, a somewhat larger head 272 spaced from the head 271 and a third head 273 and this valve member is acted upon by a coil spring 274. A stop for the valve member is shown at 275. The body has an exhaust port 276, an exhaust port 277, and an exhaust port 278.

There is a lock up shift valve 280 and in the body thereof is a valve member with relatively small head or land 281, a somewhat larger head 282 and a third head 283. The valve member is acted upon by a coil spring 284 while a stop for the valve member is shown at 285. The lock up shift valve has an exhaust port 286 and an exhaust port 287.

In considering the system further, it is believed that it would be more clear if reference characters are not applied to ports in the various valve constructions where the lines or conduits connect thereto. Where a conduit connects to a valve, the reference numeral of the conduit or line itself will suffice. It will be appreciated that the various valves may, if desired, all be incorporated in one centralized location or in one body, so to speak, but the separation of them in the diagrammatic view of FIG. 5 facilitates understanding of the system. It will also be understood that some of the conduits may be formed by passageways in some of the mechanical elements of the transmission or formed between such elements as is customary.

Extending from the front engine driven pump 35 is a pressure line 300 with a branch 301 which connects to the valve 280 in the vicinity of the land 282. The line 300 also extends to and through the main pressure regulator valve in the vicinity between the heads 204 and 205; a branch 302 extends to the pressure line of the rear pump 175 and is provided with a check valve 304. A branch of this pressure line, as shown at 305, extends to the throttle regulating valve while a further branch 306 connects into the lock up clutch cut off valve, and specifically to the interior of the valve member 233. The line continues through the valve 233 as indicated at 308 and it extends to the selector valve. Also, a branch of the line as shown at 309 connects into the overdrive shift valve 270 in the vicinity of the head 272.

A pressure line 315 extends from the rear pump 175 and the line 302 is connected thereto through the check valve 304. Line 315 also connects to the governor valve 260 in the vicinity of the head 264 and the line 315 has a relief orifice 316.

Extending from the main pressure regulator valve 200 is a line 320 which connects into the main pressure regulator valve between the heads 205 and 206 and which extends to the torque converter to keep the torque converter supplied with oil. Actually line 320 passes to the torque converter between the sleeve 19 and the member 38. Leading from the torque converter is a line 321 for the discharge of oil from the torque converter and this line runs through an oil cooler 322 from where the oil is conducted through a suitable lubricating system as indicated at 323. Suitable pressure is maintained in the lubricating system by the pressure relief valve 324.

Figure 6:
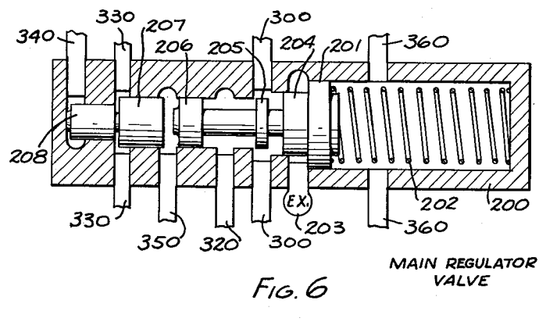
FIG. 6 is a view illustrating the main pressure regulator valve shifted to an operating position.
Figure 11:
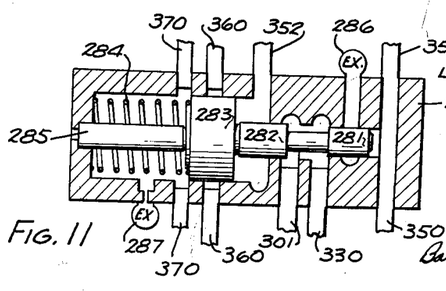
FIG. 11 is a view illustrating the shifted position of the lock up shift valve.

The pressure for engaging the lock up clutch is obtained through a line 330. This line 330 extends from the lock up shift valve 280 (FIGS. 5 and 11) and extends through the main pressure regulator valve so that it acts upon the head 207 (FIGS. 5 and 6). The line 330 continues on to the lock up cut off valve (FIGS. 5 and 7) through port 234, and then extends to the cylinder 22. Actually this line or conduit extends through an axial passage in the shaft 9.

The pressure for actuating the splitter gear unit or overdrive unit as it may be called, is obtained through a line 333 which connects into the overdrive shift valve as shown and extends to the cylinder 55. The connection of line 333 with the cylinder 55 is static and needs no rotating seals. The Pitot tube 67 is connected by line 335 to the governor valve, and both ends of this line embodies static conditions.

The lines of conduits for the high clutch and the intermediate, low and reverse brakes, all extend from the selector valve. The line 340 extends from the selector valve to the high clutch cylinder 81. Actually this line connects into the cylinder through the wall of the cylinder between sealing devices as indicated.

The high clutch line 340 also connects into the main pressure regulator valve in a location to act upon the piston 208. The line 341 extends from the selector valve to the cylinder 108 for the intermediate range. The line 342 extends from the selector valve to the low brake cylinder 136. Line 343 extends from the selector valve to the reverse brake cylinder 164.

There is a system for hydraulic medium or oil having its source at the governor valve 260. This comprises a line 350 which connects into the governor valve, and a branch of which 351 extends to the governor valve so as to act upon the piston head 264. The line 350 passes into the overdrive shift valve 270 to act on the piston head 271 and it extends to the lock up shift valve to act upon the head 281, while a branch 352 extends to the lock up shift valve to act between the heads 283 and 282. The governor pressure line 350 also extends to the main pressure regulator valve and connects thereto in a location so as to act upon the head 206.

There is a pressure line 360 with a branch 361 which connects into the throttle regulator valve as indicated, and a branch 362 which connects into the interior of the member 240 through port 241. Another branch 363 of this line connects into the throttle regulator valve in the vicinity of the head 223. The line 360 extends to the main pressure regulator valve to act reversely to the main line pressure, to the lock up shift valve 280 so as to act upon the head 283 and it also extends to the overdrive shift valve 270 to act upon the head 273.

A pressure line 370 connects into the throttle regulator valve in the vicinity of the head 223 and this line 370 also extends to and through the lock up shift valve 280 so as to act upon the head 283 and it also extends into the overdrive shift valve 270 to act upon the head 273. The line 370 has a check valve 371 therein positioned between the lock up shift valve 280 and the overdrive shift valve 270, so as to pass oil in one direction but not in the other.

In considering the operation of the system, it may be regarded that the several valves are shown in an at rest position in FIG. 5. Of course, when the vehicle is at rest and the engine is not operating there is no pressure in the system. When the engine is started, the front pump 35 supplies oil under pressure through line 300 to the main pressure regulator valve 200, to the lock up shift valve 280, to and through the lock up cut off valve 233, to the vicinity of the piston head 231, to the overdrive shift valve 270, and to the selector valve. With the selector valve positioned as shown, the cylinder for the high clutch and the intermediate, low and reverse brakes are vented. The pressure in the line is controlled by the main pressure regulator valve 200 because if the pressure increases indicent to acceleration of the engine, the valve member 201 is shifted to the right as FIG. 5 is viewed, thus opening pressure line 300 to the exhaust 203. This happens because the head 204 is larger than the head 205. However, before there is an exhaust the head 205 shifts to connect line 300 to the line 320 (FIG. 6) thus supplying oil to the converter and thence through the converter, the cooler and lubricating system. The term oil is used for convenience inasmuch as an oil is commonly employed although is not intended that the term be delimiting to the extent of excluding any other hydraulic medium.

Figure 7:
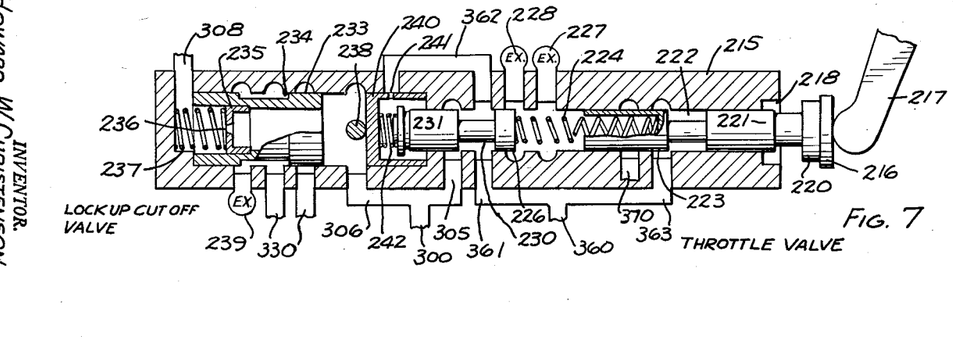
FIG. 7 is a view illustrating the throttle regulator valve and lock up cut off valve shifted to positions different from that shown in FIG. 5.
Figure 8:
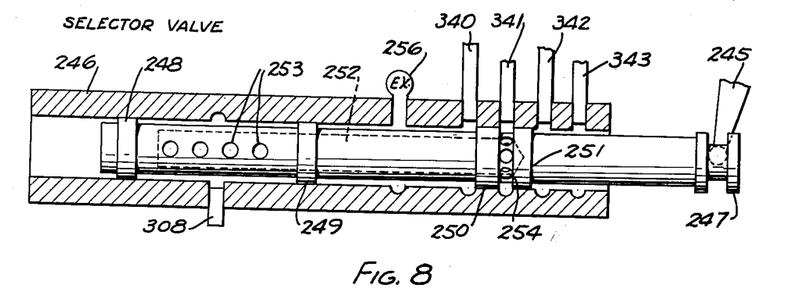
FIG. 8 is a view illustrating the selector valve shifted to intermediate position.
Figure 9:
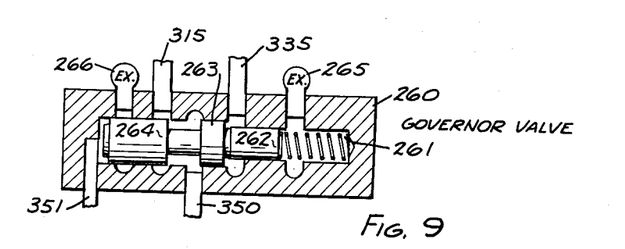
FIG. 9 is a view showing the governor valve shifted to operating position.
Figure 10:
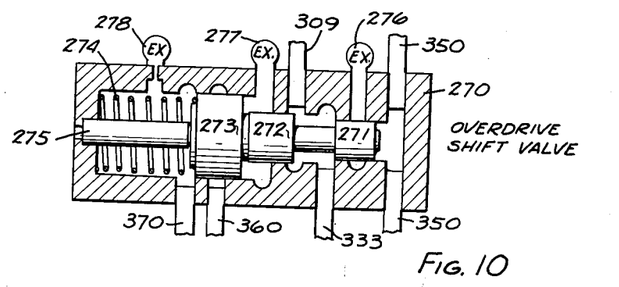
FIG. 10 is a view showing the shifted position of the overdrive shift valve.

We shall assume that the operator wishes to start in low range, progress through intermediate range and finally arrive in the high range. The operator will, therefore, manipulate the selector valve to position the ports 254 in registry with the line 342. In this position the lands 250 and 251 isolate the line 342 from all other lines. This action is usually followed by an acceleration of the engine. There is a demand for oil to fill the low brake cylinder 136. This results in a flow of oil through the orifice 236 of the lock up cut off valve. As a result there is a differential pressure on opposite sides of the orifice with the higher pressure on the upstream side and the lower pressure on the down-stream side. This shifts the valve member 233 to the left and connects the portion of the line 330 extending from the lock up cylinder to the exhaust 239 (FIG. 7). This vents the lock up clutch cylinder for release of the lock up clutch but in this initial operation, it happens not to be engaged. As soon as the cylinder 136 is filled the flow ceases and the valve 233 moves back to the position shown, thus completing line 330 through port 234. When the low range brake is engaged torque is transmitted through the torque converter, through the overdrive unit at a 1:1 ratio, through the low range gearing to the final output member 77. As the vehicle begins to move the rear pump 175 begins operation and pressure therefrom is delivered to the governor valve through the line 315. The rotation of the ring of oil in the collector 66 transmits pressure through line 335 to the governor valve where it acts upon the head 263. The governor valve initially may have been slightly opened for connecting line 315 to line 350 with the result that governor pressure fills line 350 and all its branches. The governor pressure acts upon the main pressure regulator head 206 thus serving to aid the pressure in line 300 in acting against the spring 202. This lowers the pressure in line 300 and lessens the work required of the pumps. The pressure in line 350 thus acts upon the overdrive shift valve and also the lock up shift valve.

It will be noted that the governor pressures in line 351 acts on the governor valve urging it to the right. As the speed of the vehicle increases, the pressure incident to the ring of oil in the collector 66 increases the pressure in line 335 and this pressure acts upon the head 263 tending to further open the connection between the pressure line 315 and the governor pressure line 350. The governor valve thus serves as a relay pressure regulator in that the actuating pressure in line 335 acts against the regulator pressure in line 351.

At this time, the throttle valve may have been shifted to the point where the head 231 opens the connection between the pressure line 305 and the pressure line 361 (FIG. 7). This is a pressure regulating arrangement as oil in the branch 362 is transmitted to one end of the head 231 and the pressure in line 361 and 360 is dependent upon the position of the throttle valve acting through spring 224 and the pressure regulating valve member 231. The pressure in line 360 thus acts upon the lock up shift valve member 283 and the overdrive shift valve member 273. Thus, the lock up shift valve is under the influence of opposing pressures, one largely due to the position of the throttle and the other due to the pressure in the governor pressure line 350 which is the result of speed of operation. When the pressure emanating from the Pitot tube is sufficiently high, it shifts the governor valve toward more open position and the pressure in line 350 increases. Upon sufficient increase the pressure on head 281 shifts the lock up shift valve member against pressure in line 360, and head 282 thus shifts to open the connection between line 301 and line 330. Oil is then transmitted through line 330 and port 234 of the lock up cut off valve to the cylinder 22 and the lock up clutch becomes engaged. The arrangement is that the lock up clutch engages after the torque converter has converted torque through its full range and is acting as a fluid coupling. Note that the pressure for the lock up clutch system is effective upon the head 207 of the main pressure regulating valve. As soon as the lock up shift valve has shifted to the left to energize the lock up clutch the head 282 is acted upon by the pressure in line 301 and since head 282 is larger than head 281 the pressure in line 301 serves additionally to hold the lock up shift valve in shifted position and provide a hysteresis effect. Therefore, the pressure in the governor line 350 may reduce to a point less than that which is necessary to actuate the lock up shift valve. This provides for stability of operation and prevents the lock up shift valve from fluttering.

The drive is now transmitted through the lock up clutch, through the overdrive gear unit at a 1:1 ratio, and through the low range gearing in the range change section. Upon continued acceleration, the pressure in the line 335 increases, thus further shifting the governor valve 260 and increasing the pressure in the line 350. At the requisite pressure the overdrive valve member is shifted to the left, and the pressure line 309 is connected to the line 333 for conducting oil to the cylinder 55 to begin engagement of the brake of the overdrive unit. The demand for oil in the cylinder 55 results in flow through the hollow valve member 233 and as above explained, the pressure on the upstream side of the orifice 236 is greater than that on the downstream side and the valve member 233 shifts to the left to vent the lock up clutch cylinder 22 through the exhaust 239. Thus at the time of the change of the ratio in the overdrive unit the lock up clutch is disengaged and torque is transmitted through the torque converter which cushions the shift. When the overdrive cylinder 55 is filled, flow of oil thereto ceases, the valve member 233 moves back to the position shown and the lock up clutch again engaged. The torque is now transmitted through the lock up clutch through the overdrive unit in overdrive relationship, and through the low range gears in the range change section. This may be regarded as the second mechanical gearing.

As previously stated, some manual operation is contemplated when the operator senses that a higher speed range is desired. The operator merely shifts the selector valve with impunity to align the ports 254 with the line 341 which connects to the intermediate cylinder 108. The cycle of change from low to intermediate is much the same as that previously described. In the first place the low range brake cylinder 136 is vented. Flow of oil into the intermediate brake cylinder 108 causes shift of the valve member 233 because of the differential pressures on the upstream side and the downstream side of the orifice 236 and the lock up clutch cylinder is vented. So, while the change is being made from low to intermediate, the drive is through the torque converter which cushions the shift. When the intermediate brake cylinder 108 is satisfied, the valve member 233 shifts back to the position shown and the lock up clutch re-engages. Considering that the speed of the output member 77 is somewhat constant, the speed of operation of the engine is lower with the result that the pressure at the Pitot tube is lowered. This lowers the pressure in the governor line 350 and the overdrive shift valve member shifts back to the position shown in FIG. 5 thus cutting off the overdrive cylinder 55 from the pressure line 309 and venting it at 276. This releases the brake of the overdrive unit and due to the overrunning clutch 49, the planetary gear unit thereof locks up to transmit torque therethrough at a 1:1 ratio. This is the third mechanical range with torque transmitted through the lock up clutch through the overdrive unit at a 1:1 ratio and through the intermediate gearing.

Upon further acceleration the pressure emanating from the Pitot tube increases, the governor valve functions to again increase the pressure in line 350 to shift the valve member of the overdrive shift valve 270 to the left for the transmission of oil to the cylinder 55 to engage the brake of the overdrive unit. When the brake is engaged, the transmission is in fourth speed transmitting torque through the lock up clutch, through the overdrive unit in overdrive condition and through the intermediate gearing. This engagement of the brake of the overdrive unit is accompanied by a dumping of the lock up clutch cylinder caused by flow of oil to the cylinder 55 so that the shift is cushioned.

At an appropriate time the operator may shift the selector valve for the conduction of oil to the high range clutch cylinder 81. This is accompanied by venting the intermediate cylinder and the flow of oil to the cylinder 81 again causes shift of the valve member 233 to vent the lock up clutch cylinder to cushion the shift from intermediate to high. The resultant lower speed of the engine driven power input members results in a lowering of pressure emanating from the Pitot tube with the lowering of the pressure in the governor line 350 and the overdrive shift valve moves back to the position shown thus venting the overdrive unit cylinder 55 so that the planetary gearing transmits torque at a 1:1 ratio. This is the fifth gear or speed ratio with torque transmitted through the lock up clutch, the overdrive unit at 1:1 ratio and through the high range gearing. As the speed of engine and engine driven parts increase, the pressure at the Pitot tube increases, shifting the governor valve, further opening the line 350 to line pressure to increase the pressure therein to shift the overdrive shift valve to the left for the supply of oil to the cylinder 55 to thus engage the brake of the overdrive unit and cause it to transmit torque in overdrive condition. This is accompanied by the dumping or venting by block up clutch cylinder for cushioning the shift. When the cylinder 55 is filled, and the brake of the overdrive unit is engaged, the lock up clutch cylinder 22 is again open to line pressure and the lock up clutch engaged. This is the sixth gear ratio with torque transmitted through the lock up clutch through the overdrive unit in overdrive relationship and through the high gearing.

It will be noted that the line 340 which conducts oil to the high range clutch also conducts oil to the main pressure regulator to act upon the piston 208. This is a further pressure acting against the spring 202 of the main pressure regulator valve and reduces the line pressure and, therefore, the work required of the pumps. The pressure required during operation in the high range, that is, the pressure required to hold the high clutch engaged, is considerably lower than that required for the low and reverse gearing. This arrangement lowers the line pressure for normal operation in high range. This relieves the running seals which are present in the high range clutch. As pointed out above, the control pressures; namely, governor, lock-up clutch, and high clutch pressures act respectively on heads 206, 207 and 208 to individually control regulator valve 200 to reduce the pressure in main line 300. The total pressure reduction is equal to the largest pressure reduction provided by any one of the control pressures.

It will be understood that after the original shift of the valve member of the lockup shift valve 280, the lock up shift valve member remains held in shifted position through the various gear ranges above described. Each time the overdrive shift valve member moves to the position shown in FIG. 5 for dumping the brake cylinder of the overdrive unit, oil is transmitted through the line 360 thereto, but this pressure cannot flow into the lock up shift valve to act upon the piston 283 because of the check valve 371. The engagement and disengagement of the lock up clutch during range change is accomplished at the cut off valve 233 without movement of the lock up shift valve.

A similar situation exists when the operator moves the selector valve to reverse position where oil is conducted through the ports 254 to line 343 to the cylinder 164 of the reverse brake. As oil flows into the cylinder the lock up clutch cylinder 22 is vented, but it probably is not engaged anyway since the shift to reverse is usually made from an at rest condition. In other words, the lock up clutch line 330 is closed by the lock up shift valve 280. When the reverse brake is engaged, torque is transmitted through the torque converter and reverse gearing. The torque will be initially transmitted through the torque converter but if torque is transmitted in reverse for any considerable length of time accompanied by acceleration, the lock up clutch will eventually engage the same as it does in transmitting torque forwardly. And upon further acceleration and increase of pressure at the Pitot tube, the governor valve will be actuated to in turn operate the overdrive shift valve to supply oil to the cylinder 55 and engage the brake of the overdrive unit. The engagement of the brake is accompanied by a dumping of the cylinder of the lock up clutch to cushion the shift. Thus there are two mechanical speeds in reverse as well also as the advantages gained by the torque converter.

An overcontrol or kick down control arrangement is provided so that the operator, by depressing the accelerator to the limit of its movement, may cause a shift to a lower range. When the head 220 of the throttle valve starts to enter the recess 218 there is a detent action which provides intelligence to the operator and by applying additional load on the accelerator the operator may shift the throttle valve to cause the head 220 to enter recess 218. When this is done, the valve head 223, shifts to the left against spring 224 and provides a direct connection between line 363 and line 370. Line 370 transmits oil to the lock up shift valve 280, the pressure of which is effective upon the head 283, and it conveys oil under pressure to the overdrive shift valve 270 to act upon the piston 273. If the governor pressure in the line 350 is low enough to warrant and permit a down-shift, the pressure acting upon the head 273 shifts the overdrive shift valve back to the position shown in FIG. 5, thus cutting off the overdrive cylinder 55 from the line pressure, and venting it at 276 for disengagement of the overdrive brake. In this disengagement the brake slips and the clutch member 50 and member 48 accelerate and when they reach the speed of the shaft 9 the overrunning clutch prevents further acceleration and the overdrive unit now transmits torque in 1:1 ratio. The member 48 comes up to the speed of the shaft 9 and is engaged by the overrunning clutch member in a smooth non-bumping manner. Thus, the speed ratio has been reduced with the change being made in the overdrive unit. Furthermore, if pressure in the governor line 350 permits the pressure in line 370 will shift the lock up shift valve back to the position shown in FIG. 5 thus cutting off the lock up clutch line 330 from the line pressure and venting it as 286 so that the lock up clutch disengages and torque is transmitted through the torque converter. It will be observed that this down-shift by the kick down overcontrol action can be made only under proper conditions dependent upon the pressure in the governor line 350. This overcontrol can be accomplished in any one of the speed ranges, high, intermediate or low, although a skilled operator may use it only in the high speed range. When the throttle valve is retracted from its kick-down position the pressure in line 370 is cut off at the head 223 and the condition of the system is restored to normal depending again upon the pressure in the governor line 350.

In making a down-shift which may be required, for example, when the vehicle is going up an incline, the operator may make no controlling function until after the pressure in the Pitot tube is lowered to the point where the pressure in the governor line 350 can no longer hold the overdrive shift valve against the pressure in line 360. The overdrive shift valve will then move back to the FIG. 5 position cutting off pressure to the cylinder 55 and the member 48 will come up to the speed of the shaft 9 and lock to it for a 1:1 drive. If a further reduction is needed, say from high to intermediate, the operator may then shift the selector valve to supply oil to the intermediate clutch cylinder 108 and dump the high range clutch cylinder. The flow of oil through the orifice 236 causes venting of the lock up clutch cylinder so that the shift is made under the cushioning action of the torque converter and finally when the intermediate clutch is engaged and flow of oil ceases the lock up clutch re-engages. Assuming a constant vehicle speed the engine will now operate at a higher speed and the increased pressure may shift the overdrive shift valve 270 to supply oil to the cylinder 55 to establish an overdrive condition in the overdrive unit. The same cycle is repeated in the shift from intermediate to low. However, since the transmission is under some control of the operator, a shift may be made from high to intermediate or intermediate to low at speeds such that the governor pressure in line 350 maintains oil under pressure in the overdrive clutch cylinder 55 so that the overdrive unit remains in overdrive relationship.

Due to the check valve arrangement at 304 the rear pump pressure can never exceed line pressure. This is because the rear pump pressure line is connected through line 302 to the main pressure regulator valve. The several pressures effective upon the main pressure regulator valve through lines 300, 350, 330 and 340 are not additive due to the fact that the heads or pistons 206, 207 or 208 are separated. The result is that the pressure on the main pressure regulator valve is that of the line exerting the greatest force.

I claim:

1. A mechanism for transmitting torque at different ratios from an engine having a throttle, comprising in combination, a fluid torque converter unit having an impeller, a turbine, a power output member, a driving member to be driven by the engine and connected to the impeller, means connecting the turbine and power output member, a friction clutch for coupling together the driving member and the power output member; a planetary gear unit having a carrier connected to said power output member, a sun gear, a ring gear, and a power output element connected to the ring gear, the carrier having planet gears cooperating with the sun gear and ring gear, a friction brake having ground members and a member connected to the sun gear, a unidirectional coupling between the sun gear and said power output member arranged to engage when the sun gear tends to overrun the power output member; a range change unit for transmitting torque from the power output element and having a final power output member comprising, a plurality of inter-related planetary gear sets, a plurality of friction devices including one which is operable to lock up a planetary gear set for high speed range, two which are for engaging and holding stationary elements of the inter-related planetary gear sets for intermediate and low speed ranges; manually operated means under the control of an operator for selectively engaging said friction devices, means responsive to the speed of operation and the position of the engine throttle for automatically engaging the said friction clutch of the torque converter unit, means responsive to different speeds of operation and the position of the engine throttle for automatically engaging the friction brake of the planetary gear unit, and means controlled by said manually operated means to provide a different speed at which said last named means is operative for each friction device selectively engaged by said manually operated means.

2. A mechanism for transmitting torque at different ratios from an engine having a throttle, comprising in combination, a driving member for connection to the engine, a final power output member, three units connected in series between the driving member and the final output member, the first unit comprising a fluid torque converter and a lock up clutch connected in parallel; the second unit comprising, a planetary gear set having a sun gear member, a ring gear member, a carrier member with planetary gears, a unidirectional coupling between one member and the driven member of the lock up clutch for locking up the planetary gear set for a 1:1 driving ratio, a friction brake for holding another member at zero r.p.m. for conditioning the gear set to transmit torque in overdrive relationship; the third unit comprising a plurality of inter-related planetary gear sets having sun gear members, ring gear members and carrier members with planet gears, a plurality of friction engaging devices, one of which is engageable to lock up the third unit for the transmission of torque at 1:1 ratio, and at least one other of which is a friction brake for holding at zero r.p.m. a member of a planetary gear set for the transmission of torque at a different speed ratio; manually operated means under the control of an operator for selectively engaging the friction devices, means responsive to the speed of operation and the position of the engine throttle for automatically engaging the said lock up clutch in the first unit, means responsive to different speeds of operation and the position of the engine throttle for automatically engaging the friction brake of the second unit, and means controlled by said manually operated means to provide a different speed at which said last named means is operative for each friction device selectively engaged by said manually operated means.

3. A mechanism for transmitting torque at different ratios from an engine having a throttle, comprising in combination, a driving member for connection to the engine, a final output member, three units connected in series between the driving member and final output member; the first unit comprising a fluid torque converter and a lock up clutch connected in parallel therewith; the second unit comprising a planetary gear set with lock up means for normally conditioning the gear set for the transmission of torque at 1:1 ratio, and a friction brake for holding a member of the gear set at zero r.p.m. for the transmission of torque in overdrive relationship; the third unit comprising a plurality of inter-related planetary gear sets, a plurality of friction control devices respectively engageable to lock up the third unit for transmission of torque at 1:1 ratio and for holding at zero r.p.m. a member of a planetary gear set for the transmission of torque at a different ratio, manually controlled means shiftable at will by an operator to selectively engage the friction devices of the third unit, means responsive to speed of operation and the position of the engine throttle for automatically engaging the lock up clutch of the first unit, means responsive to different speeds of operation and the position of the engine throttle for automatically engaging the friction brake of the second unit, and means controlled by said manually controlled means to provide a different speed at which said last named means is operative for each friction device selectively engaged by said manually operated means.

4. A mechanism for transmitting torque at different ratios for an engine having a throttle, comprising in combination, a driving member for connection to the engine, a final output member, three units connected in series between the driving member and final output member; the first unit comprising a fluid torque converter and a lock up clutch connected in parallel therewith; the second unit comprising a planetary gear set with lock up means for normally conditioning the gear set for the transmission of torque at 1:1 ratio, and a friction brake for holding a member of the gear set at zero r.p.m. for the transmission of torque in overdrive relationship; the third unit comprising a plurality of inter-related planetary gear sets, a plurality of friction control devices respectively engageable to lock up the third unit for transmission of torque at 1:1 ratio and for holding at zero r.p.m. a member of a planetary gear set for the transmission of torque at a different ratio, a hydraulic control system having a source of oil under pressure and including hydraulic motors, one for engaging the lock up clutch, one for engaging the friction brake, and one for engaging each of the friction control devices, a selector valve shiftable at will by an operator to selectively connect into the hydraulic system the motors for the friction control devices of the third unit, first means responsive to the speed of operation and the position of the engine throttle for automatically engaging the lock up clutch of the first unit, a second means responsive to different speeds of operation and the position of the engine throttle for automatically engaging the friction brake of the second unit, and means controlled by said selector valve to provide a different speed at which said last named means is operative for each friction device selectively engaged by said selector valve.

5. The mechanism as described in claim 4 characterized in that there is a governor valve in the hydraulic system, conduit means for conducting oil to the governor valve at pressures which vary with the speed of operation of the final output member for actuating the governor valve, the said first means being a lock up shift valve hydraulically connected to the governor valve and shiftable incident to pressure received from the governor valve to connect the motor of the lock up clutch into the system, and the second said means being an overdrive shift valve hydraulically connected to the governor valve and shiftable incident to pressure received from the governor valve to connect the motor of the friction brake of the second unit into the system.

6. The mechanism as described in claim 5 further characterized in that there is a conduit for conducting oil under pressure to the said lock up and overdrive shift valves to operate thereon in opposition to the pressure received from the governor valve, and valve means operable by the engine throttle for connecting the hydraulic system to the last named conduit.

7. A mechanism for transmitting torque at different ratios from an engine having a throttle, comprising in combination, a driving member for connection to the engine, a final output member, three units connected in series between the driving member and final output member; the first unit comprising a fluid torque converter and a lock up clutch connected in parallel therewith; the second unit comprising a planetary gear set with lock up means for normally conditioning the gear set for the transmission of torque at 1:1 ratio, and a friction brake for holding a member of the gear set at zero r.p.m. for the transmission of torque in overdrive relationship; the third unit comprising a plurality of inter-related planetary gear sets, a plurality of friction control devices respectively engageable to lock up the third unit for transmission of torque at 1:1 ratio and for holding at zero r.p.m. a member of a planeary gear set for the transmission of torque at a different ratio, a hydraulic control system having a source of oil under pressure and including hydraulic motors, one for engaging the lock up clutch, one for engaging the friction brake, and one for engaging each of the friction control devices, a selector valve shiftable by an operator at will to selectively connect into the hydraulic system the motors for the friction control devices of the third unit, a governor valve, a lock up shift valve, an overdrive shift valve, the valves being hydraulically connected for the transmission of oil under pressure from the governor valve to the lock up shift valve and overdrive shift valve for actuating the same, valve means under control of the engine throttle for transmitting oil under pressure to the lock up shift valve and overdrive shift valve acting in opposition to the oil under pressure received from the governor valve, and means for conducting oil under pressures which vary with the speed of operation to the governor valve for actuating the same for the supply of oil from the governor valve to the lock up shift valve and overdrive shift valve.

8. The mechanism as described in claim 7 characterized in that the means for conducting oil under varying pressures to the governor valve comprises a Pitot tube, an oil collector ring connected to a rotating element in one of the units and in which the Pitot tube is disposed, and conduit means extending from the Pitot tube to the governor valve.

9. In a transmission for transmitting torque from an engine having a throttle, a torque converter having an impeller connected to the engine and a turbine connected to a torque transmitting member, a friction lock up clutch for engaging the engine directly with the torque transmitting member, a gear unit driven by the torque transmitting member, first means for conditioning the gear unit for the transmission of torque at one ratio, second means operable to condition the gear unit for the transmission of torque at a different ratio, a system for hydraulic medium (oil) under pressure, a governor valve in the system, an oil collector ring mounted on a rotary element to rotate therewith, a Pitot tube positioned in the collector ring, conduit means connecting the Pitot tube and the governor valve, the governor valve being shiftable by oil under pressure and the pressure effective thereon being variable with the speed of rotation of the oil in the collector ring, a lock up shift valve, a gear shift valve, conduit means connecting the governor valve with the lock up shaft valve and the gear shift valve so that oil under pressure from the governor valve tends to shift the same, other conduit means for conducting oil to the lock up shift valve and gear shift valve, a valve in the system movable by and with movements of the engine throttle for controlling introduction of oil under pressure into said other conduit means, said other conduit means conducting the oil so that the pressure thereof acts upon the lock up shift valve and gear shift valve in opposition to the pressure received from the governor valve, conduit means extending from the lock up shift valve to the lock up clutch for engaging the lock up clutch by oil under pressure incident to shift of the lock up shift valve, and conduit means extending from the gear shift valve to the second means of the gear unit for operating said second means to condition the gear unit for transmission of torque at said different ratio.

10. A mechanism for transmitting torque at different ratios from an engine, comprising in combination, a driving member for connection to the engine, a final output member, two units connected in series between the driving member and final output member; the first unit comprising a fluid torque converter and a lock-up clutch means connected in parallel therewith; the second unit comprising a gear assembly providing a low and a high torque ratio and actuating means to engage said low and high ratio, a source of fluid under pressure, a regulator valve to regulate the pressure of said source, means to provide a governor force varying with the speed of operation of the transmission, lock-up control means responsive to speed of operation for automatically connecting said source to said lock-up clutch means to engage the lock-up clutch means, automatic shift means responsive to the speed of operation for connecting said source to said actuating means to actuate said actuating means to selectively provide low or high ratio in said second unit, means acting on said regulator valve including means responsive to said governor force to decrease the regulated pressure, means responsive to the pressure supplied to said lock-up clutch means to decrease said regulated pressure, and means responsive to the pressure supplied to said actuator means to decrease said regulated pressure.

11. A mechanism for transmitting torque at different ratios from an engine, comprising in combination, a driving member for connection to the engine, a final output member, two units connected in series between the driving member and final output member; the first unit comprising a fluid torque converter and a lock-up clutch means connected in parallel therewith; the second unit comprising a gear assembly providing a low and a high torque ratio, and actuating means to engage said low and high ratio, a source of fluid under pressure, a regulator valve to regulate the pressure of said source, means to provide a governor pressure varying with the speed of operation of the transmission, a lock-up control means responsive to speed of operation for automatically connecting said source to said lock up clutch means to engage the lock-up clutch means, automatic shift means responsive to the speed of operation for connecting said source to said actuating means to actuate said actuating means to selectively provide low or high ratio in said second unit, means acting on said regulator valve including first means responsive to said governor pressure to decrease the regulated pressure, second means responsive to the pressure supplied to said lock-up clutch means to decrease said regulated pressure, and third means responsive to the pressure supplied to said actuator means to decrease said regulated pressure.

12. A mechanism for transmitting torque at different ratios from an engine having a throttle, comprising in combination, a driving member for connection to the engine, a final output member, two units connected in series between the driving member and final output member; the first unit comprising a fluid torque converter and a lock-up clutch means connected in parallel therewith; the second unit comprising a gear assembly providing a low and a high torque ratio, and actuating means to engage said low and high ratio, a source of fluid under pressure, a regulator valve to regulate the pressure of said source, means to provide a throttle pressure varying with engine throttle, means to provide a governor pressure varying with the speed of operation of the transmission, lock-up control means responsive to speed of operation and the position of the engine throttle for automatically connecting said source to said lock-up clutch means to engage the lock-up clutch means, automatic shift means responsive to the speed of operation and the position of the engine throttle for connecting said source to said actuating means to actuate said actuating means to selectively provide low or high ratio in said second unit, regulating means acting on said regulator valve including first means responsive to said throttle pressure varying with the engine throttle to increase the regulated pressure, second means responsive to said governor pressure to decrease the regulated pressure, third means responsive to the pressure supplied to said lock-up clutch means to decrease said regulated pressure, and fourth means responsive to the pressure supplied to said actuator means to decrease said regulated pressure.

13. A mechanism for transmitting torque at different ratios comprising in combination, a driving member for connection to an engine, a final output member, a front unit driven by said driving member and a rear unit driving said final output member; said front unit normally providing a high torque ratio drive and shiftable to a low torque ratio drive comprising a gear unit providing a low and a high torque ratio and low torque ratio fluid actuated means operative on the supply of fluid to engage said low torque ratio, said rear unit comprising a gear unit providing first and second torque ratios and first and second fluid actuated means operative on the supply of fluid to engage said first and second ratios respectively, a source of fluid under pressure, a manually controlled valve shiftable at will be an operator from a first to a second position to selectively connect said source to said first and second fluid actuated means to positively select at substantially all speeds of operation in said first position said first ratio and in said second position said second ratio in said rear unit, an automatic shift valve responsive to different speeds of operation for automatically shifting from a first position to a second position to connect said source to and to actuate said low torque ratio fluid actuating means to provide a change between said normal high ratio and said low torque ratio in said front unit either at a first range of intermediate speeds of said final output member or at a second range of higher intermediate speeds of said final output member and means responsive to said manually controlled valve to change the speed of operation of said automatic shift valve from said first to said second speed of operation accordingly as said manually controlled valve is in said first or second position and said rear unit is in said first or second ratio.

14. A mechanism for transmitting torque at different ratios, comprising in combination, a driving member for connection to an engine, a final output member, three units connected in series between said driving member and final drive member; the first unit driven by said driving member comprising a fluid drive and a fluid operated lockup clutch connected in parallel with said fluid drive; the second unit normally providing a high torque ratio and shiftable to a low torque ratio comprising a gear set providing a low and a high torque ratio and low torque ratio fluid actuated means operative on the supply of fluid to engage said low torque ratios, the third unit comprising a gear set connected to said final drive member and providing first and second torque ratios and first and second fluid actuated means operative on the supply of fluid to engage said first and second ratios respectively, a source of fluid under pressure, a manually controlled valve shiftable at will by an operator from a first to a second position to selectively connect said source to said first and second fluid actuated means to select in said first position said first ratio and in said second position said second ratio in said third unit, a lockup valve operative to connect said source to said fluid operated lockup clutch to engage said lockup clutch in a first range of final output member speeds and in a second range of final output member speeds, an automatic shift valve responsive to different speeds of operation for automatically shifting from a first position to a second position to connect said source to and to actuate said low torque ratio fluid actuating means to provide a change between said normal high ratio and said low torque ratio in said second unit either at a first range of intermediate speeds of said final output member or at a second range of higher intermedaite speeds of said final output member and means responsive to said manually controlled valve to change the speed of operation of said lockup valve and said automatic shift valve from said first to said second speed of operation accordingly as said manually controlled valve is in said first or second position and said third unit is in said first or second ratio.

15. A mechanism for transmitting torque at different ratios, comprising in combination, a driving member for connection to an engine, a final output member, three units connected in series between said driving member and final output member; the first unit driven by said driving member comprising a fluid drive and a lockup clutch connected in parallel with said fluid drive; the second unit comprising a gear unit providing a low and a high torque ratio and first actuating means to engage said low and high ratio, the third unit driving said final output member comprising a gear unit providing first and second torque ratios and a second actuating means to engage said first and second ratios, manually controlled means shiftable at will by an operator from a first to a second position to selectively control said second actuating means to selectively provide at substantially all speeds of operation in said first position said first ratio and in said second position said second ratio in said third unit, lockup control means responsive to speed of operation of the transmission for automatically engaging said lockup clutch of said first unit in a first range of final output member speeds and in a second range of final output member speeds, automatic shift means responsive to different speeds of operation for automatically shifting to actuate said first actuating means to selectively provide low or high ratio in said second unit in a first range of final output member speeds and in a second range of final output member speeds of operation and means responsive to said manually controlled means to change the speed of operation of said lockup control means and said automatic shift means from said first to said second range of final output member speeds of operation accordingly as said manually controlled means is in said first or second position and said third unit is in said first or second ratio.

16. A mechanism for transmitting torque at different ratios from an engine having a torque demand indicating device, comprising in combination, a driving member for connection to an engine, a final output member, three units connected in series between said driving member and final output member; the first unit driven by said driving member comprising a fluid drive and a lockup clutch connected in parallel with said fluid drive; the second unit comprising a gear unit providing a low and a high torque ratio and first actuating means to engage said low and high ratio, the third unit driving said final output member comprising a gear unit providing first and second torque ratios and a second actuating means to engage said first and second ratios, manually controlled means shiftable at will by an operator from a first to a second position to selectively control said second actuating means to selectively provide at substantially all speeds of operation in said first position said first ratio and in said second position said second ratio in said third unit, lockup control means responsive to speed of operation of the transmission and the position of said torque demand indicating device for automatically engaging said lockup clutch of said first unit in a first range of final output member speeds and in a second range of final output member speeds, automatic shift means responsive to different speeds of operation and the position of said torque demand indicating device for automatically shifting to actuate said first actuating means to selectively provide low or high ratio in said second unit in a first range of final output member speeds and in a second range of final output member speeds of operation and means responsive to said manually controlled means to change the speed of operation of said lockup control means and said automatic shift means from said first to said second range of final output member speeds of operation accordingly as said manually controlled means is in said first or second position and said third unit is in said first or second ratio.

17. In a transmission, a driving member, a driven member, a mechanism for transmitting torque between said members, including a fluid drive, a lockup clutch connected in parallel with said fluid drive, gearing connected in series with said fluid drive and lockup clutch, and arranged to be conditioned to transmit torque at a plurality of different ratios, a hydraulic motor for actuating said lockup clutch, hydraulic motor means connected to said gearing and operable thereon for establishing different speed ratios in said gearing on the supply of fluid thereto, a hydraulic control system having a source of hydraulic medium under pressure, control means for connecting said source to said motor means for said gearing to establish a selected speed ratio including a valve through which the fluid flows, said valve having a bore with an inlet connected to said source and an outlet connected to said motor means and a movable valve member in said bore hydraulically between said inlet and outlet, said movable valve member having opposed end faces in said bore and a restricted orifice passage extending through said valve member from face to face for the flow of hydraulic medium to said motor means for said gearing in all positions of said movable valve member providing differential pressures on opposite sides of said orifice incident to the flow, means responsive to said differential pressures to shift said movable valve member from a first to a second position, means including a second passage from said source to said motor controlled by said valve for supplying hydraulic medium to said hydraulic motor for engaging said lockup clutch, and said valve body and movable valve member having means controlling said passage in said first position of said movable valve member opening said passage to connect said source to said motor to engage said clutch and in said second position closing said passage to cut off the supply of hydraulic medium from said source to said motor for the clutch and opening an exhaust port connected to said motor to vent said motor for the lockup clutch to disengage the lockup clutch for the transmission of torque through the torque converter to cushion the action of shifting from one ratio to another in said gearing.

18. In a transmission, a driving member, a driven member, a mechanism for transmitting torque between said members, including a fluid drive, a lockup clutch connected in parallel with said fluid drive, gearing connected in series with said fluid drive and lockup clutch and arranged to be conditioned to transmit torque at a plurality of different ratios, a hydraulic motor for said lockup clutch having an engaged and disengaged position, hydraulic motor means connected to said gearing and operable threon for establishing different speed ratios in said gearing on a change in the volume of fluid therein, a hydraulic control system having a source of fluid under pressure, control means for connecting said motor means to said source or to exhaust to establish a selected speed ratio including a passage portion for the flow of fluid during a ratio change, valve means including a movable valve member located in said passage portion having opposed surfaces and a restricted orifice extending through said valve member from one to the other of said surfaces providing flow through said restricted orifice in said passage portion between said source and motor means in all valve positions and differential pressures on opposite sides of said valve member incident to the flow acting on said opposed surfaces to shift said movable valve member from a first to a second position, and means connecting said source through said movable valve member in one position for supplying fluid to said motor to move said motor to one position and an exhaust connected through said movable valve member in another position to said motor to permit movement of said motor to another position.

19. In a transmission for transmitting torque at different ratios, said transmission having gearing providing a plurality of ratios, hydraulic motor means operable selectively and effective on said gearing to change the condition of said gearing for transmitting torque at different ratios on a change in volume of fluid and operative on maintaining the volume of fluid to maintain a ratio for transmitting torque, a fluid drive for transmitting torque to said gearing, a lockup clutch locking up said fluid drive and transmitting torque directly to said gearing, a clutch motor operable to engage and release said clutch, a hydraulic control system having a source of fluid under pressure, means including a passage for conducting fluid from said source to said clutch motor, a valve in said passage having opposed surfaces and biased to a first position connecting said source to said clutch motor and movable to a second position blocking said source and connecting said clutch motor to exhaust, and means including an orifice member through which hydraulic medium flows in all positions of said valve between said source to said hydraulic motor means of said gearing during a change of ratio to provide differential pressures, and means connecting each of said differential pressures to act on one of said opposed surfaces of said valve for moving the valve in response to the flow of fluid to said second position to cause it to close said passage and open said clutch motor to said exhaust whereby the clutch disengages and said fluid drive transmits torque to the gearing substantially as a ratio shift is made in said gearing to cushion the shift.

20. A transmission control system for use with a ratio changing transmission comprising, a source of fluid under pressure, a drive ratio engaging motor, a valve pody having an axial bore having an inlet connected to said source and an outlet connected to said drive engaging motor and arranged for the flow of fluid from said inlet through said bore to said outlet and drive engaging motor to perform ratio shift functions in a transmission, a valve element mounted for axial movement in said bore hydraulically between said inlet and outlet, spring means holding said valve element in a normal position, said valve element having axially opposed faces in said bore and a passage extending between said faces to connect said bore portions at each end of said valve element for flow of the fluid from said inlet through said bore and passage to said outlet in all valve positions, said passage including an orifice providing differential pressures established upon flow of fluid through said bore and passage on opposite sides of said orifice to act on said opposite faces to shift said valve element against said spring means, another motor in the transmission requiring a supply of fluid to control the drive, and said valve body and valve element having means actuated by movement of said valve element in one position connecting said source to said another motor and in a second position connecting said other motor to exhaust.

21. A controlling valve structure for use in a hydraulic system for a ratio changing transmission and the like comprising, a source of hydraulic medium under pressure, a valve body having an axial bore with an inlet and an outlet arranged for the flow therethrough of hydraulic medium from said inlet adapted to be connected to a fluid pressure source to said outlet adapted to be connected to a transmission to perform ratio shift functions in the transmission, a valve element mounted for axial movement in said bore and closing said bore, spring means holding said valve element in a normal position, said valve element having axially opposed faces in said bore and a passage extending through said valve element between said faces to connect said bore portions at each end of said valve element for axial flow of the hydraulic medium from said inlet through said bore and passage to said outlet in all valve element positions, said passage including an orifice providing differential pressures established upon flow of hydraulic medium through said bore and passage on opposite sides of said orifice to act on said opposed faces to shift said valve element against said spring means to a second position, connecting means adapted to connect a source to control another transmission function including a supply port adapted to be connected to a source of fluid pressure and a controlled port, and said valve element connecting said supply port to said controlled port in one position and closing said supply port in another position and connecting said controlled port to an exhaust port to vent the hydraulic medium.

22. In a hydraulic control system for controlling a machine, a source of fluid under pressure, regulating valve means regulating the pressure of said source at a normal value including a valve element having an unbalanced area acted on by said fluid of said source at all times during operation of the valve to move said valve element in one direction and a spring to move said valve element in the opposite direction, a first control means providing a first control fluid under pressure to control a machine, a second control means providing a second control fluid under pressure to control the machine, first regulator valve control means actuated by said first control fluid being effective individually on said regulating valve means to reduce the pressure of said source a predetermined amount in accordance with the pressure of said first control pressure, second regulator valve control means actuated by said second control fluid being effective individually on said regulating valve means to reduce the pressure of said source a predetermined amount in accordance with the pressure of said second control pressure and means permitting individual operation of said first and second regulator valve control means on said regulator valve and joint operation to a degree equal to the larger of said predetermined amounts.

23. In a hydraulic control system for controlling a machine, a source of fluid under pressure, regulating valve means regulating the pressure of said source having a bore with a regulating valve element and a regulating plug independently movably mounted in said bore, said regulating valve element having a first and second unbalanced area, said regulating plug element having oppositely facing surfaces, one of said oppositely facing surfaces facing said second unbalanced area of said regulating valve element and providing a first chamber in said bore between said regulating valve element and said regulating plug element, said source being connected to said first unbalanced area to act on said regulating valve element in one direction, spring means acting on said regulator valve in the opposite direction, a first control means providing a first control fluid under pressure to control a machine, a second control means providing a second control fluid under pressure to control a machine, said first control means being connected to said first chamber between said second unbalanced area and said one surface of said regulating plug element and being effective on said regulating valve to modify the pressure of said source, said second control means being connected to said bore to act on the other surface of said regulating plug element opposite to said one surface facing said regulating valve element and being effective on said regulating valve to change the pressure of said source except when and only when said second control means pressure acting on said other surface provides a larger force than said first control means pressure acting on said one surface.

24. In a hydraulic control system for controlling a machine, a source of fluid under pressure, regulating valve means including a valve element having an unbalanced area acted on by fluid from said source to move said valve element in one direction and a spring acting on said valve element to move said valve in the opposite direction to regulate the pressure of said source located in a bore with a closed end, said valve element having an end area located in said bore and a regulating plug located in said bore between the regulating valve and the end of said bore, a first control means providing a first control fluid under pressure to control a machine, a second control means providing a second control fluid under pressure to control a machine, said first control fluid being connected to said bore between the adjacent faces of said regulating valve element and plug and being effective on said regulating valve means to reduce the pressure of said source, the other control fluid being connected to the end of said bore to act on the end of said regulating plug facing the end of said bore and being effective on said regulating valve means to reduce the pressure of said source except when said pressure is reduced by said one control fluid.

25. In a transmission, an input member, a transmission having a plurality of ratios and an output member, a fluid drive and a direct drive clutch connecting said input member to said transmission, a clutch motor actuating said direct drive clutch, a plurality of ratio motors operable to engage said plurality of ratios, a source of fluid under pressure, regulating valve means regulating the pressure of said source at a normal value, ratio control means connecting said source and said ratio motors to successively engage said ratio motors to provide changes from one ratio to another ratio, direct clutch control means connecting said source and said clutch motor to engage said direct clutch, said direct clutch control means including first regulator valve control means effective on said regulating valve means to vary the pressure of said source in one direction from said normal value in response to operation of said direct clutch control means to effect a change of condition of said clutch motor actuating said direct drive clutch, said ratio control means including a second regulator valve control means acting on said regulating valve means to vary the pressure of said source in said one direction from said normal value in response to operation of said ratio control means to effect a change of ratio by said ratio motors.

26. The invention defined by claim 25 and said regulator valve including means responsive to said first and second regulator valve control means to effect a variation in pressure from said normal value not greater than the individual variation of each of said first and second regulator valve control means.

27. In a transmission, an input member, a transmission having a plurality of ratios and an output member, a fluid drive and a direct drive clutch connecting said input member to said transmission, a clutch motor actuating said direct drive clutch, a plurality of ratio motors operable to engage said plurality of ratios, a source of fluid under pressure, regulating valve means regulating the pressure of said source at a normal value, ratio control means connecting said source and said ratio motors operable to successively engage said ratio motors to provide changes from one ratio to another ratio, direct clutch control means connecting said source and said clutch motor operable to engage said direct clutch, said direct clutch control means including a first regulator valve control means effective on said regulating valve means to vary the pressure of said source from said normal value in response to operation of said direct clutch control means to effect operation of said clutch motor actuating said direct drive clutch, said ratio control means including a second regulator valve control means acting on said regulating valve means to vary the pressure of said source from said normal value in response to operation of said ratio control means to effect a change of ratio.

28. In a transmission mechanism for transmitting torque from a driving member to a driven member, a gear unit connecting said driving and driven members, first means operatively connected to said gear unit for conditioning said gear unit for the transmission of torque at one ratio, second means operatively connected to said gear unit for conditioning said gear unit for the transmission of torque at a different ratio, a source of fluid under a regulated pressure, control valve means for connecting said source to selectively control said first and second means having a movable element shiftable to cause operation of said second means, said control means being shiftable by pressure of fluid, said gear unit including a rotary mechanical element rotating about said axis and rotating during the transmission of torque from said driving to said driven members having a large diameter compared to the diameter of said driving and driven members, a sheet metal fluid collector ring means mounted concentrically about and fixed on said rotary mechanical element for rotation therewith for providing an annular trough having a base and annular side walls extending inwardly and adapted to retain by centrifugal force a ring of fluid rotating therewith, a pitot tube disposed in the fluid ring having an open end facing in the direction opposite the direction of rotation of said collector ring means and the fluid therein, whereby the pressure in said pitot tube varies with the speed of rotation of the said ring of fluid and said mechanical element, and closed conduit means extending from said pitot tube and connected to said control valve means to supply said fluid under pressure in said pitot tube and to confine said fluid under pressure in said closed conduit means to act on said movable element for causing shift of said movable element incident to requisite fluid pressure from said pitot tube to operate said control valve means to operate said second means.

29. In a transmission mechanism for transmitting torque from a driving member to a driven member; a planetary gear unit including, drive means connected to said driving member, reaction means and driven means connected to said driven member, first means operatively connected to said gear unit for conditioning said gear unit for the transmission of torque at one ratio, and second means operatively connected to said gear unit for conditioning said gear unit for the transmission of torque at a different ratio; a source of fluid under a regulated pressure; control valve means for connecting said source to said second means having a movable element shiftable to selectively cause operation of said first and second means; said control means being shiftable by pressure of fluid, one of said means of said planetary gear unit including a rotor having a large diameter compared to the diameter of said driving and driven members forming a part of said planetary gear unit and rotating with one of said members and partially enclosing said planetary gear unit and having an external annular surface concentric with said gear unit and being located between said driving and driven members, fluid collector ring means mounted on said annular surface of said rotor for rotation therewith for providing an annular trough having a base and side walls having a larger inner diameter than the diameter of said rotor within said collector ring and adapted to retain by centrifugal force, a ring of fluid rotating therewith, a pitot tube disposed in the fluid ring having an open end facing in the direction opposite the direction of rotation of said collector ring and the fluid therein, whereby the pressure in said pitot tube varies with the speed of rotation of the said ring of fluid and said mechanical element, and closed conduit means extending from said pitot tube and connected to said control valve means to supply said fluid under pressure in said pitot tube and to confine said fluid under pressure in said closed conduit means to act on said movable element for causing shift of said movable element incident to requisite fluid pressure from said pitot tube to operate said control valve means to operate said second means.

30. In a transmission mechanism for transmitting torque from a driving shaft to a driven shaft, a gear unit having a sun gear member, a ring gear member, and a carrier member with planetary gears, one member of said gear unit being the control member, the other members of said gear unit being the torque transmitting members, a first of said torque transmitting members being connected to said driving shaft, a second of said torque transmitting members being connected to said driven shaft, one of said torque transmitting members having an annular surface having a large diameter compared to the diameter of said shaft, first means operatively connected to said gear unit for conditioning said gear unit for the transmission of torque at one ratio including said one of said torque transmitting members, second means operatively connected to said gear unit for conditioning said gear unit for the transmission of torque at a different ratio, a source of fluid under a regulated pressure, control valve means for connecting said source to selectively control said first and second means, said control means having a movable element shiftable to cause selective operation of said first and second means, said control means being shiftable by pressure of fluid, an oil collector ring concentrically secured to said one of said torque transmitting members and abutting said annular surface, said oil collector ring having a base wall and radially inwardly extending side walls, one wall being annular and having an inner diameter larger than the outer diameter of said ring gear and adapted to retain by centrifugal force, a ring of fluid rotating therewith, a pitot tube disposed in the fluid ring having an open end facing in the direction opposite the direction of rotation of said collector ring and the fluid therein, whereby the pressure in said pitot tube varies with the speed of rotation of the said ring of fluid and said mechanical element, and closed conduit means extending from said pitot tube and connected to supply said fluid under pressure in said pitot tube and to confine said fluid pressure in said closed conduit means to act on said movable element for causing shift of said movable element incident to requisite fluid pressure from said pitot tube.

31. In a transmission mechanism for transmitting torque from a driving member to a driven member, a gear unit having a sun gear, a ring gear member, and a carrier with planetary gears, said sun gear being controlled, said members of said gear unit being the torque transmitting members, one of said torque transmitting members being connected to said driving member, another of said torque transmitting members being connected to said driven member, one of said torque transmitting members having a large diameter external annular surface, first means operatively connected to said gear unit for conditioning said gear unit for the transmission of torque at one ratio, second means operatively connected to said gear unit for conditioning said gear unit for the transmission of torque at a different ratio, a source of fluid under a regulated pressure, control means hydraulically connected to said second means and having a movable element shiftable by pressure of fluid to cause operation of said second means, an oil collector ring concentrically secured to said annular surface to rotate therewith and adapted to retain by centrifugal force, a ring of fluid rotating therewith, a pitot tube disposed in the fluid ring having an open end facing in the direction opposite the direction of rotation of said collector ring and the fluid therein, whereby the pressure in said pitot tube varies with the speed of rotation of the said ring of fluid and said mechanical element, and closed conduit means extending from said pitot tube and connected to supply said fluid under pressure in said pitot tube and to confine said fluid pressure in said closed conduit means to act on said movable element for causing shift of said movable element incident to requisite fluid pressure from said pitot tube.

32. In a transmission mechanism for transmitting torque from a driving member to a driven member, a gear unit having a sun gear, a ring gear and a carrier with planetary gears, said driving member connected to said carrier, said driven member connected to said ring gear, said sun gear being the control member, said ring gear having an external annular surface having a large diameter compared to the diameter of said driving and driven members, first means operatively connected to said gear unit for conditioning said gear unit for the transmission of torque at one ratio, second means operatively connected to said gear unit for conditioning said gear unit for the transmission of torque at a different ratio, a source of fluid under a regulated pressure, control means hydraulically connected to said second means and having a movable element shiftable to cause operation of said second means, said control means being shiftable by pressure of fluid, an oil collector ring concentrically secured to said annular surface to rotate therewith and adapted to retain by centrifugal force, a ring of fluid rotating therewith, a pitot tube disposed in the fluid ring having an open end facing in the direction opposite the direction of rotation of said collector ring and the fluid therein, whereby the pressure in said pitot tube varies with the speed of rotation of the said ring of fluid and said mechanical element, and closed conduit means extending from said pitot tube and connected to supply said fluid under pressure in said pitot tube and to confine said fluid pressure in said closed conduit means to act on said movable element for causing shift of said movable element incident to requisite fluid pressure from said pitot tube.

33. In a pressure regulator for controlling fluid pressure in a chamber; pressure regulator means including valve means having a closed position and an exhaust position adapted to connect a pressure chamber to exhaust; means to bias said valve means to said closed position; said valve means having an unbalanced area acted on by the fluid to move the valve means to an exhaust position to regulate the fluid pressure at a normal value; said valve means including a first control pressure responsive means individually operative in response to a first control pressure for acting on said valve means for varying the regulated pressure of said fluid from said normal value, additional control means including a second control pressure responsive means individually operative in response to a second control pressure for acting on said valve means for varying the regulated pressure of said fluid fom said normal value, and a third control pressure responsive means individually operative in response to a third control pressure for acting on said valve means for varying the regulated pressure of said fluid from said normal value; and said contol means being operative, when more than one of said control pressure responsive means are operative in response to more than one of said control pressures, one of said control pressures besides acting on said valve means also acting on one of said control pressure responsive means in opposition to at least one other control pressure for limiting the variation of the regulated pressure of said fluid from said normal value to an amount equal to the largest individual variation in the pressure from said normal value of said fluid provided by one of said first, second and third control pressure responsive means acting individually.

34. A pressure regulator valve as set forth in claim 33, wherein all three of the control pressure responsive means vary the pressure in the same direction of magnitude.

References Cited in the file of this patent

UNITED STATES PATENTS

| | | |
|---|---|---|
| 184,653 | Napier | Nov. 21, 1876 |
| 2,096,733 | Corydon | Oct. 26, 1937 |
| 2,135,246 | Yoxall | Nov. 1, 1938 |
| 2,193,524 | Thompson | Mar. 12, 1940 |
| 2,215,627 | Walter | Sept. 24, 1940 |
| 2,316,848 | Evans | Apr. 20, 1943 |
| 2,324,713 | McFarland | July 20, 1943 |
| 2,329,724 | Maurer | Sept. 21, 1943 |
| 2,332,593 | Nutt et al. | Oct. 26, 1943 |
| 2,352,212 | Lang et al. | June 27, 1944 |
| 2,413,675 | Baker | Jan. 7, 1947 |
| 2,485,214 | Peterson | Oct. 18, 1949 |
| 2,599,215 | Wemp | June 3, 1952 |
| 2,640,373 | Jandasek | June 2, 1953 |
| 2,645,135 | Frank | July 14, 1953 |
| 2,645,137 | Roche | July 14, 1953 |
| 2,667,085 | Ackerman | Jan. 26, 1954 |
| 2,675,102 | Robinson | Apr. 12, 1954 |
| 2,697,368 | Winther et al. | Dec. 21, 1954 |
| 2,720,120 | Orr et al. | Oct. 11, 1955 |
| 2,737,064 | Stoeckicht | Mar. 6, 1956 |
| 2,738,689 | Dodge | Mar. 20, 1956 |
| 2,747,433 | Forster | May 29, 1956 |
| 2,766,639 | Rosenberger | Oct. 16, 1956 |
| 2,774,376 | Young | Dec. 18, 1956 |
| 2,775,144 | Kelbel | Dec. 25, 1956 |
| 2,775,982 | Canfield | Jan. 1, 1957 |
| 2,875,643 | Kelley | Mar. 3, 1959 |
| 2,919,603 | Livermore | Jan. 5, 1960 |

FOREIGN PATENTS

| | | |
|---|---|---|
| 589,095 | Great Britain | June 11, 1947 |